US009665272B2

(12) United States Patent
Brown et al.

(10) Patent No.: US 9,665,272 B2
(45) Date of Patent: May 30, 2017

(54) TOUCH GESTURE FOR CONNECTION OF STREAMS IN A FLOWSHEET SIMULATOR

(71) Applicant: Invensys Systems, Inc., Foxboro, MA (US)

(72) Inventors: Harry Scott Brown, Yorba Linda, CA (US); Alexander Chamorro, Frisco, TX (US)

(73) Assignee: Invensys Systems, Inc., Foxboro, MA (US)

( * ) Notice: Subject to any disclaimer, the term of this patent is extended or adjusted under 35 U.S.C. 154(b) by 238 days.

(21) Appl. No.: 14/193,949

(22) Filed: Feb. 28, 2014

(65) Prior Publication Data

US 2015/0248232 A1    Sep. 3, 2015

(51) Int. Cl.
*G06F 3/0488* (2013.01)
*G06F 3/0486* (2013.01)
*G06F 9/44* (2006.01)
*G06Q 10/06* (2012.01)
*G06Q 50/02* (2012.01)

(52) U.S. Cl.
CPC ........ *G06F 3/04883* (2013.01); *G06F 3/0486* (2013.01); *G06F 8/24* (2013.01); *G06F 8/34* (2013.01); *G06Q 10/067* (2013.01); *G06Q 50/02* (2013.01)

(58) Field of Classification Search
CPC ...... G06F 3/0486; G06F 8/34; G06F 3/04883; G06F 8/24; G06Q 10/067; G06Q 50/02
See application file for complete search history.

(56) References Cited

U.S. PATENT DOCUMENTS

| 7,337,409 | B2 | 2/2008 | Doblmayr et al. |
| 7,650,575 | B2 | 1/2010 | Cummins et al. |
| 7,958,454 | B2 | 6/2011 | Gaudette |
| 8,682,908 | B2* | 3/2014 | Cho ................... G06F 17/30126 |
| | | | 707/752 |
| 2006/0053407 | A1 | 3/2006 | Kodosky et al. |
| 2009/0199213 | A1 | 8/2009 | Webster et al. |
| 2010/0235803 | A1 | 9/2010 | Gramark et al. |
| 2012/0262458 | A1* | 10/2012 | Fowler .................... G06T 19/00 |
| | | | 345/427 |

OTHER PUBLICATIONS

Visio Team, "Inserting and Delteing Shapes in Visio 2010", Sep. 29, 2010, http://blogs.msdn.com/b/visio/archive/2009/09/29/inserting-and-deleting-shapes-in-visio-2010.aspx.*
Travis et al., LabVIEW for Everyone: Graphical Programming Made Easy and Fun, Jul. 27, 2006, Prentice Hall, Third Edition.*

* cited by examiner

*Primary Examiner* — Aaron Lowenberger
(74) *Attorney, Agent, or Firm* — Stephen Manetta; Susmita Bhandari

(57) ABSTRACT

A system for iteratively connecting flowsheet model components. Software instructions stored on a memory device and executable by a processor provide for the connection of flowsheet model components by, in response to a received connection indication from a user, suggesting potential connections in response to the connection indication. After further receiving a response from the user confirming the suggested potential connection, an output is rendered on the flowsheet workspace.

30 Claims, 5 Drawing Sheets

TOUCH GESTURE FOR CONNECTION OF STREAMS IN A FLOWSHEET SIMULATOR

BACKGROUND

Aspects of the present invention generally relate to the fields of networked distributed system (or automated system) software programming, simulation program design, and flowsheet building, and more particularly to systems and methods to create and implement flowsheet models that are composed of distributed process system components.

Process control engineers and the like use flowsheets to represent process control systems that are to be monitored and/or controlled. Such flowsheets generally simulate the execution of a distributed process system at a level above a regulatory control layer in a process control system to provide guidance to lower level control elements such as, by way of example, programmable logic controllers or distributed control systems (DCSs).

One aspect of modern automated systems involves the use of intelligent field devices, capable of enabling control functionality at increased proximity to the process itself. Computer driven automated systems employing intelligent devices have become widespread in the field of DCSs. Accompanying this widespread use has been an increasingly critical need to simulate the performance of these automated systems, in order to best predict the automated system's performance under a wide array of testing situations and environments. Process simulation models are a valuable tool in assessing the performance of automated systems.

Process simulation model components are represented in the context of process simulation software by objects. Objects are used by process simulation software to create simulation models that represent plant operations. One object represents a process model component (a "unit"), such as a valve, connected to another process unit, such as a pump. Simulation programs allow a user to select from a model library of objects that represent the components of the distributed process. During the creation of the model, a connection (called a "stream") must be made between the units; typically between ports on the units. As a user designs a flowsheet representing the model, it is necessary to add objects to the flowsheet and connect them to other objects. Through repeated adding and connecting actions, the flowsheet eventually contains numerous objects connected in a variety of ways to represent an actual or simulated chemical process system. Stretching streams between object ports can prove tedious, in that this connection process must be repeated many times over to complete the construction of a model. In this manner, the connection process can be made easier for a user by reducing the time and steps required to complete a connection.

Further, selecting the appropriate port for stream connection can be problematic when the relative size of the port makes designating the port difficult for a user. Simplifying the connection process in this instance is particularly useful considering that the simulation model may be created using a touch screen, where differences between users make interfacing with model creation software more difficult for some users than for others. In these situations, creating a design can be greatly expedited by streamlining the unit connection process. Ideally, creating connections without having to "tap" on the screen at all would facilitate faster construction of a simulation model because the improved process would be less dependent upon the differences among individual users. For example, users with less dexterity have more difficulty connecting streams using a touch screen interface.

Due to these difficulties, improvements in the model simulation construction process are needed to reduce the need for repetitive tasks and the need for a user to make overly precise movements to effect stream connections between objects in the simulation.

SUMMARY

Briefly, aspects of the present invention relate to systems and methods for enabling the simplified connection of process model components as the user constructs a simulation model. The use of these simplified connections allow a user to efficiently construct a model to simulate processes such as those used in refineries, chemical plants, or petrochemical plants, by reducing the need for the user to repetitively perform connection tasks. To this end, aspects of the present invention enable a more streamlined connection process that operates as a functional component within a distributed process simulation model application and expedites connection "streams" between objects. These streams are expedited by intuitively suggesting connections to the user when certain conditions are satisfied, instead of requiring the user to iteratively select the desired ports on the objects in order to connect the objects. In this manner, the desirable result of enabling a user to conditionally accept (or decline) a suggested connection with limited action upon the user interface is met.

In an aspect, a system selects and manipulates simulation model components, or objects. Software instructions stored on a memory device and executable by a processor enable a user-initiated drag and drop operation on the workspace. This operation includes enabling functionality to receive a connection indication to automatically connect at least two objects on the workspace and receiving the connection indication from a user via a user interface. Responsive to the connection indication received from the user, the system suggests to the user via the user interface one or more potential connections between the objects on the workspace, requests confirmation of at least one of the suggested connections, and, upon confirmation from the user, to render an output on the workspace representative of the confirmed suggestion.

In another aspect, software instructions are stored on one or more tangible, non-transitory computer-readable media and are executable by a processor.

In yet another aspect, a processor-executable method is provided.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
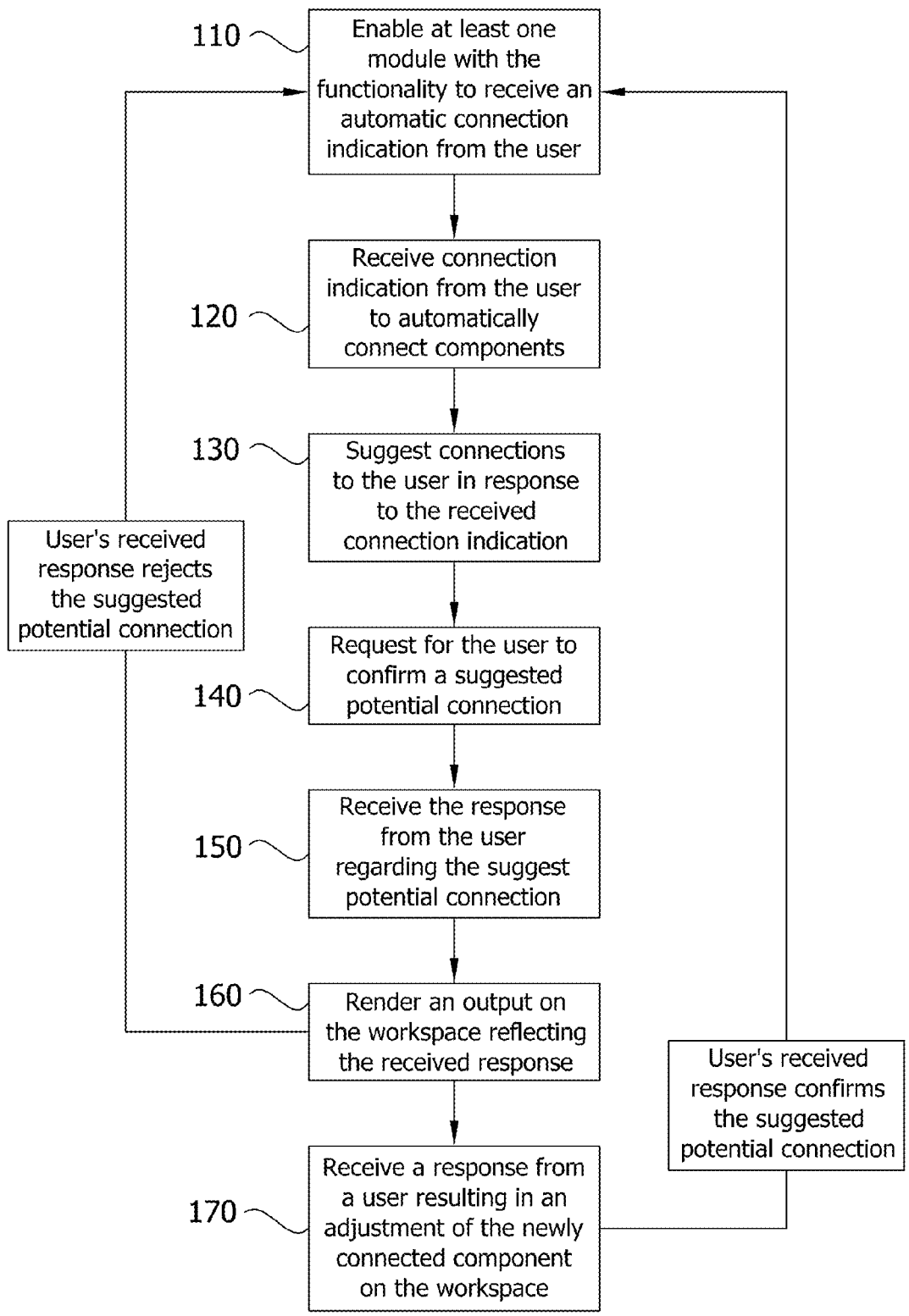
FIG. 1 is an exemplary flow diagram depicting the process of suggesting and confirming object connections to a user, implementing the user's response to the suggestions, and allowing for the readjustment of the newly connected objects in the event the user confirms the suggested connection according to one embodiment of the invention.

Aspects of the present invention capitalize on the flexibility of a graphical user interface (GUI) by extending the functionality of a connection operation. FIG. 1 is an exemplary flowchart diagram that illustrates the process by which a user establishes connections between process model components existing within a GUI taking the form of a flowsheet model of a distributed process system. In this instance, the GUI takes advantage of the computer's graphics capabilities to make the program easier to use.

In general, the GUI features a pointer or other movable basic graphic symbol on a display screen for selecting objects, modules, guidelines, and possibly other flowsheet instantiations or components. A pointing device, such as a mouse or trackball, enables a user to move the pointer and select objects on the display screen. The GUI also includes icons or other small pictures that represent commands, files, or windows. A desktop or workspace of the GUI provides an area on the display screen to group icons representing real objects on a real desktop. In an alternative embodiment, the GUI is implemented on a touch screen with the functionality to enable pointer movement and object selection by touching a screen as opposed to operating a mouse or other pointing device.

The GUI according to embodiments of the invention does not merely display visual components. In this instance, the GUI allows the user to manipulate the objects in the underlying environment. For example, the user can create new relationships between existing process model components, change existing relationships between the objects, etc. without any programming knowledge. It is to be understood that this is merely an example and the present invention is not limited specifically to GUIs.

The flowsheet model as presented to the user via the GUI is used to create objects that accurately represent every component present in an actual distributed process system, including field devices such as sensors, pumps, valves, actuators, and controllers. The flowsheet model is capable of displaying each object as an icon or other small picture or graphic that represents a process model component, module, object or program. Any item can be individually selected and manipulated, including shapes and pictures that appear on a display screen as well as less tangible software entities. Preferably, each object is capable of being configured to more accurately represent the component itself, as well as the environment in which the component exists. FIG. 1 illustrates one embodiment of the invention, and it is noted that various embodiments of the invention compose, edit, or display distributed control system components.

As shown in the connection process depicted in FIG. 1, a developer or user connects various distributed control system components by iteratively following the connection process to connect each process model component. The connection process connects objects on a flowsheet when at least one port is available on each of at least two objects.

At step 110, at least one object is enabled with the functionality to receive an automatic connection indication from the user to create a guideline. Enabling a component with the functionality to receive an automatic connection indication occurs, for example, when at least one port on each of at least two objects is available for connection. Additionally, enabling a component with automatic connection functionality causes guidelines to be displayed for showing allowable connections to a user. A "stream" refers to the connection between objects that simulates the movement of process flow. A "guideline" refers to a visual indicator of a potential connection, or potential "stream," that may result in a stream if some additional action is taken by the user, as will be described more fully below connection between objects that simulates the movement of process flow within the distributed process. Alternatively, a guideline refers to a connection of a different type. In one embodiment, making ports available for a connection requires that the ports are compatible. However, in an alternative embodiment, a component is enabled with the functionality to receive an automatic connection indication when other parameters are satisfied.

At step 120, a connection indication from the user to automatically connect the components of the distributed control system is received. This connection indication, received via the user interface, indicates that the user desires to connect ports that have been enabled with the functionality to receive an automatic connection indication. In an embodiment, the automatic connection functionality is based on an earlier determination that the ports are compatible. The user indicates the desire to connect the indicated ports on the indicated objects by, for example, a click and drag operation upon one object that brings it within a predetermined proximity to at least one other object. Additionally or alternatively, a user indicates the desire to connect the indicated ports by touching the ports together on the flowsheet. Further, the connection in the form of the creation of a guideline requires that the relevant ports are not obstructed by, for example, an unrelated object, a previously completed connection, or other instantiated objects on the flowsheet.

At step 130, suggestions in the form of guidelines are presented to the user in response to the received connection indication. Suggestions are represented by guidelines designated by various colors and/or line formats, and represent connections that are allowable based on various criteria, such as port compatibility. One example of a guideline comprises an orange colored, dashed line. As an alternative, potential connections comprise more than one guideline, if more than one port on the object being acted upon by the user is available for connection.

At step 140, a request is made for the user to confirm a suggested potential connection. A request is made based on a determination that the user has satisfied certain conditions that reduce the number of allowed connections to a single suggested potential connection. The conditions necessary for a request to be made comprise, for example, a user bringing an object into even closer proximity to a second object. Alternatively, the conditions necessary for a request to be made comprise different criteria, such as pre-designated key strokes on a key board, or mouse clicks of a sufficient duration. As one example of mouse clicks of a sufficient duration, a mouse button is released after using the mouse to hold an object stationary for a short duration while still depressing the mouse button. In other embodiments, other conditions necessary for a request to be made include touch pad or touch screen gestures of a sufficient type or duration. In an embodiment, the GUI communicates the request to the user by altering the appearance of the guideline. One example of an altered guideline is converting the orange, dashed line to a colored highlighted, solid black line. Additionally or alternatively, other alterations, such as animations or sound effects, for example, accompany the request for the user to confirm the suggested connection.

At step 150, a response is received from the user regarding the suggested connection. In an embodiment, the received response provides an indication that the user desires for the connection between the designated objects to be completed. The received response is, for example, acting upon a mouse button for a predetermined period of time. As an alternative, acting upon a mouse button further involves releasing a previously held mouse button, or depressing a mouse button. Additionally or alternatively, a user has the capability of quickly connecting process model components by assigning connection functionality to a particular key, or by acting upon pre-designated keys, such as the space bar. Further, the received response alternatively comprises a user placing a finger upon a touch pad or touch screen for a predetermined period of time.

Alternatively, the response received from the user regarding the suggested connection indicates the user does not desire to complete the suggested connection. The user provides such a response via the user interface by, for example, dragging the process model component in the opposite direction away from the object to which a connection was suggested. In another embodiment, assigning functionality to particular keys provides a response that indicates the user does not desire to complete the suggested connection when pressed. Additionally or alternatively, this response is received through drag and drop operations completed by a computer mouse, and/or by a touch pad or touch screen.

At step 160, an output is rendered reflecting the response that has been received by the user. In the event that the output rendered reflects a rejection of the suggested potential connection, a new iteration results, returning the user to step 110. In the event that the output rendered reflects confirmation of the suggested potential connection, the result of rendering the output comprises the determination that the connection between the process model components in the form of a guideline has been successfully created. In the event that the output rendered reflects confirmation of the suggested potential connection, rendering the output also comprises imposing and storing a default data label upon the guideline, based upon the data label that has been designated to the object involved in the connection as well as the data label that has been designated to the port within the object. As one non-limiting example, for a connection between a port named "Vapor" and a port named "Feed," the default data label reads "VaporToFeed" as a result.

At step 170, in the event that the output rendered reflects confirmation of the suggested potential connection, a response is received from the user that results in an adjustment of the newly connected object on the workspace. The received response comprises, for example, increasing the spacing between the objects in the event the user desires a greater spacing between the recently connected objects than was provided during the connection process. Additionally or alternatively, the received response comprises realigning the object in relation to other objects to result in an improved depiction of the components on the flowsheet. An improved depiction involves improved functionality. As an alternative, an improved depiction involves an improved appearance. An improved depiction is facilitated by giving the user the capability to constrain the movement of the selected object to ensure the newly connected stream (and any other relevant guidelines) remains horizontally or vertically aligned with its upstream object while the adjustment is completed.

Figure 2:
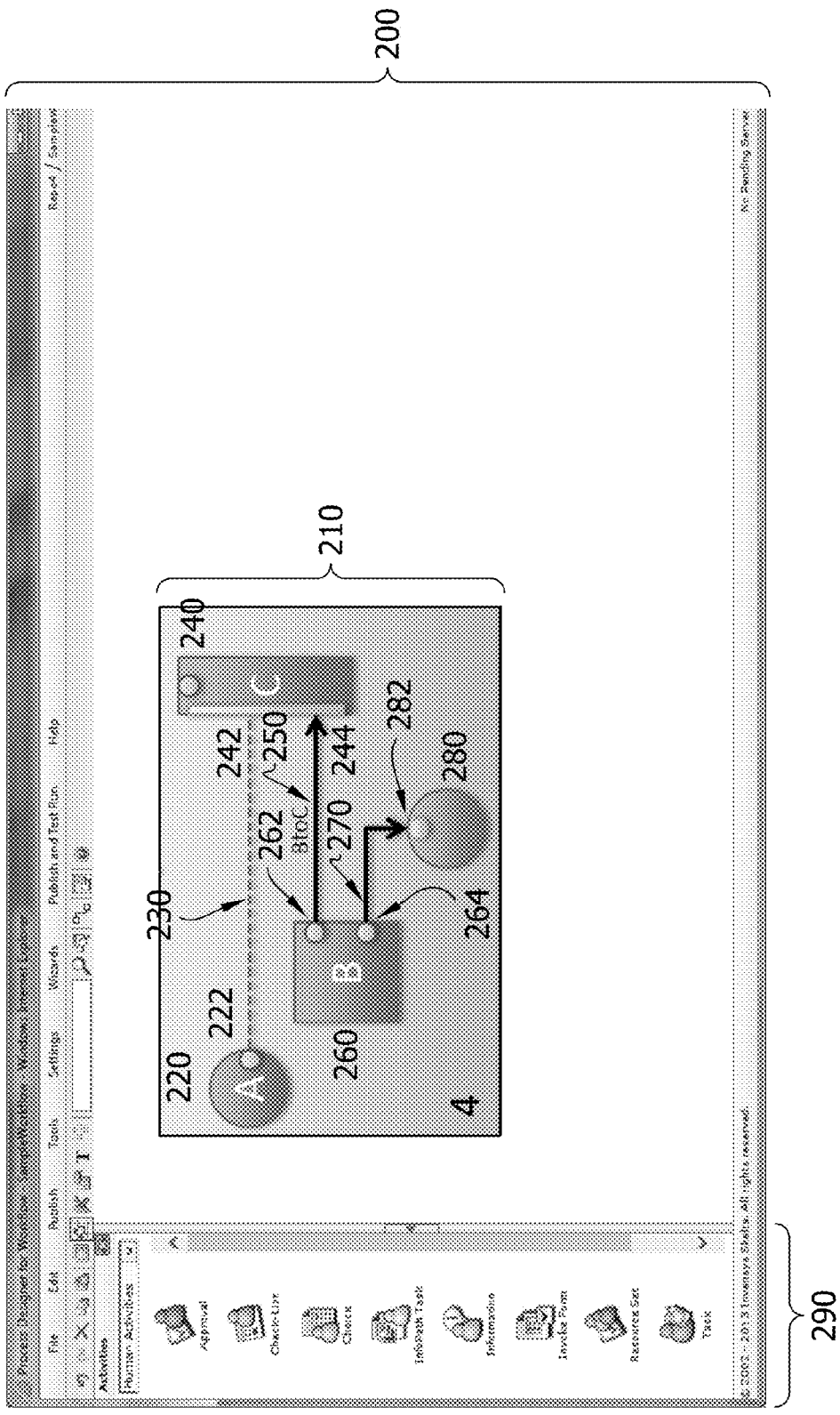
FIG. 2 is an exemplary screen shot depicting objects and guidelines connected within the confines of a flowsheet editor application according to one embodiment of the invention.

FIG. 2 depicts completed connections (solid lines) and potential connections (dashed lines) in accordance with one embodiment of the present invention. FIG. 2 depicts a guideline between objects placed upon a flowsheet in an area 210 representing part of the entirety of the editable area of an application 200 comprising a model editor application program. Objects of various sizes, shapes, and functionality 220, 240, 260, 280 are enabled with the functionality to receive an automatic connection indication from the user. Confirmed connections in the form of streams 250, 270 are visibly distinguishable from potential connections in the form of guideline 230. Connections are suggested and/or confirmed between ports 222, 242, 262, 244, 264, 282 based upon whether the ports are sufficiently close, whether the ports are compatible, whether the ports are obstructed, or any number of other factors. The connection process includes selecting an object from a sub menu or "palette" 290 located within the application and bringing the object into part of the editable area 210 of the application 200.

Figure 3:
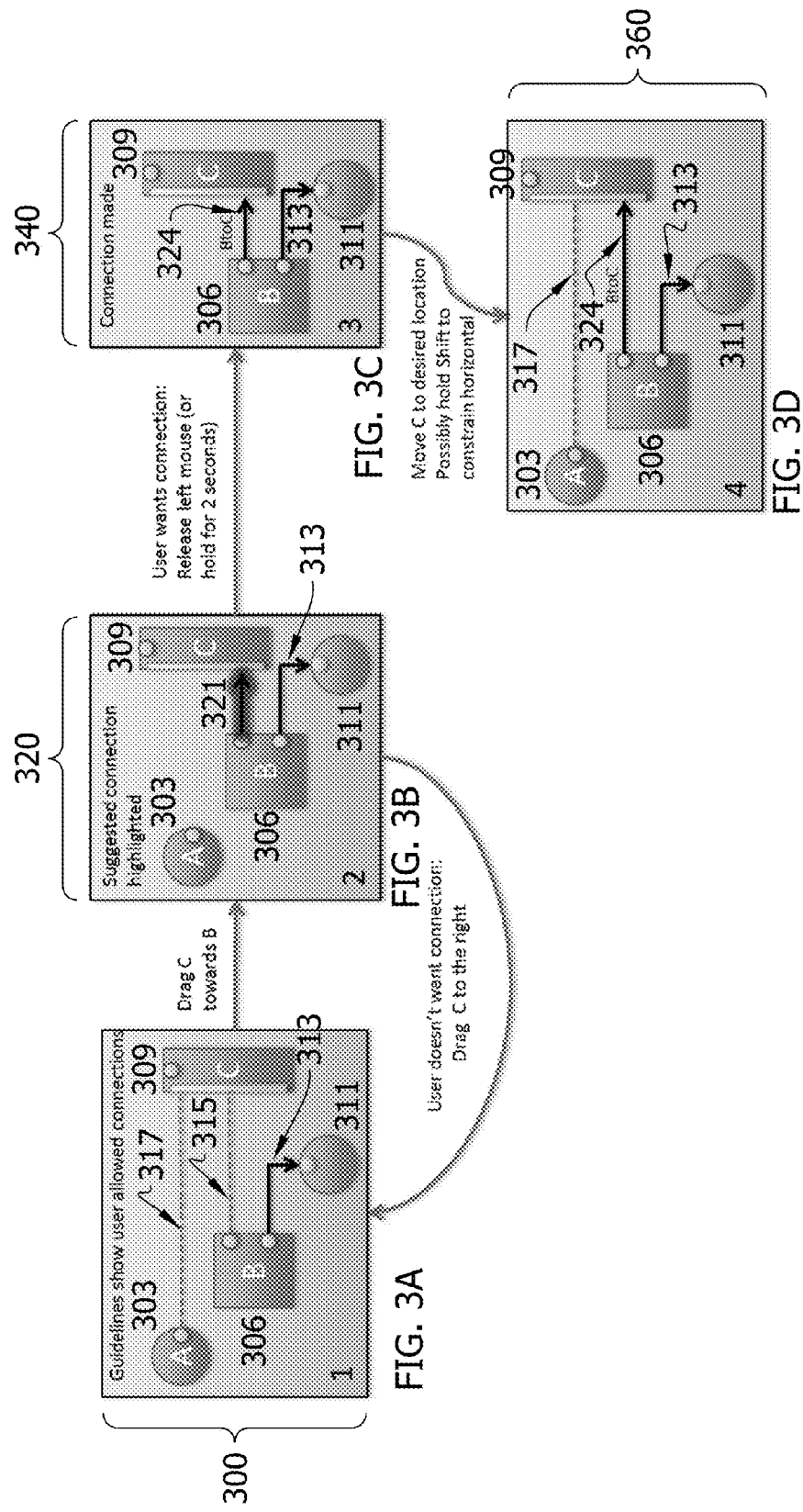
FIGS. 3A-3D depict a process of suggesting and confirming object connections to a user according to one embodiment of the invention.

FIG. 3 comprises various screenshots depicting the automated object connection process by way of presenting allowable connections to a user, suggesting potential connections to a user, and receiving responses from the user regarding the suggested potential connections. Because the connection process has previously been described in some detail in FIG. 1, additional descriptions of the connection process will only be described to the extent necessary. Variations in the arrangement and type of the components from FIG. 1 are contemplated without departing from the spirit or scope of the claims as set forth herein.

FIG. 3A depicts the beginning of the connection suggestion process in accordance with one embodiment of the present invention. An editable area 300 of FIG. 3A depicts a stream 313, as well as suggested streams indicated by guidelines 315 and 317. A user acts upon an object 309 by selecting the object with a mouse pointer from a sub menu or "palette" such as palette 290 of FIG. 2. Object 309, as well as objects 303, 306, and 311, are each enabled with the functionality to receive an automatic connection indication from the user. Objects are enabled by various means, as previously discussed. Additionally, a connection indication is received from the user to automatically connect components that are indicated by a user dragging object 309 to within a sufficiently close distance to object 306. Connection indications in the form of guidelines are also be suggested based on other criteria, as previously discussed.

FIG. 3B depicts one way in which a request for a user to confirm the suggested potential connection is made. As previously discussed, the request is made based on relative proximity between the relevant objects, or by other criteria. As depicted in an editable area 320 of FIG. 3B, objects 306 and 309, which were previously connected by a guideline reflecting allowable connection 315 in FIG. 3A, are now connected by a highlighted guideline 321 reflecting a potential connection in 3B. The suggested connection 317 between objects 303 and 309 has disappeared in FIG. 3B. Following the request for a user to confirm a suggested potential connection, a response is received regarding the suggested potential connection. In the event the user does not desire to complete the suggested connection, the user then takes an action indicating this desire, and the resulting received response returns the depicted GUI to an appearance similar to the depiction of FIG. 3A. Alternatively, another appearance results if the resulting received response indicates that the user does not desire to complete the suggested connection.

However, if the user desires to complete the connection, a response is received from the user regarding the suggested potential connection that indicates the user desires to complete the connection. This indication is a mouse release after holding the object stationary for a short duration while still depressing the mouse button, a tap of a certain duration upon a touch pad, or other means previously discussed.

FIG. 3C depicts the result displayed in the case where a user confirms the suggested connection. The editable area 340 of the flowsheet application depicts that the suggested connection 321 of FIG. 3B has been replaced with stream 324 in FIG. 3C. In this manner, based on the received response from the user confirming the suggested potential connection, an output is rendered on the workspace reflecting the received response.

FIG. 3D depicts the appearance of the editable area 360 of the flowsheet application following a received response from a user resulting in an adjustment of the newly connected component on the workspace. The user's response as depicted indicates a desire to increase the distance between the newly connected objects 306 and 309. In the event the user desires to keep the appearance of the confirmed guidelines as straight as possible, a further indication from the user is received, such as the pressing of a keyboard key, or some other indication. Here, a confirmed connection represented by a guideline 313 exists between objects 306 and 311, as depicted in FIGS. 3A-3C. Additionally, a newly confirmed connection represented by a guideline 324 connects objects 306 and 309. Finally, a previously allowed connection 317 is displayed to the user based on constraints previously discussed, providing the user with the option to iteratively complete the connection process for each object for which a potential connection exists.

Figure 4:
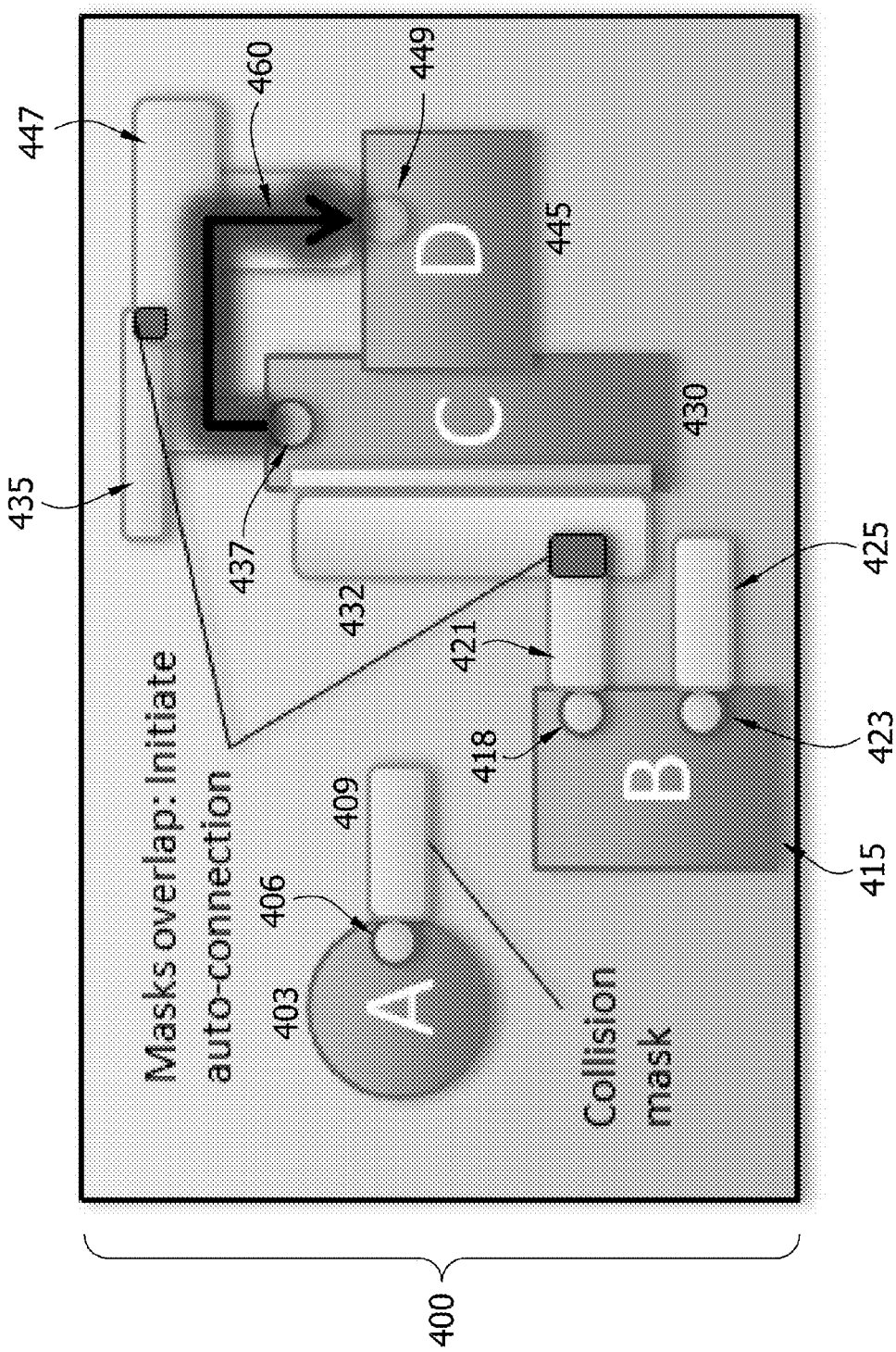
FIG. 4 depicts requesting the user to confirm a suggested potential connection through the use of collision masks according to one embodiment of the invention.

FIG. 4 depicts the initiation of a request to be made to a user to confirm a suggested potential connection through the use of "collision masks," in accordance with one embodiment of the invention. An area 400 representing one editable area of a flowsheet editor application comprises objects 403, 415, 430, and 445. Object 403 further includes a port 406 that is also represented in the workspace by extension in the form of a collision mask 409. Each depicted collision mask 409, 421, 425, 432, 435, 447 extends from a port or represents connection to a port. Each collision mask is invisible to the user during the flowsheet editing process. Alternatively, each depicted collision mask is revealed to the user throughout the flowsheet editing process. As another alternative, each or all collision masks are selectively or cumulatively made available to a user by receiving an indication from a user, such as the depression of a key on a keyboard, an indication on a mouse, an action on a touch pad or touch screen, or some other indication.

As indicated by FIG. 4, by introducing a "collision mask" that extends from each port on an object, a request can be made to a user to confirm a suggested potential connection through an efficient and expedited process. The use of collision masks also involves the use of guidelines that show user allowed connections as depicted in FIGS. 3A-3D by guidelines 315 and 317.

As indicated by FIG. 4, objects 430 and 445 are brought within a certain proximity such that their respective ports 437 and 449 represented by respective collision masks 435 and 447 come into contact. As a result, suggested potential connection 460 takes the form of the request for the user to confirm a suggested potential connection. Next, a response is received from the user regarding the suggested potential connection, an output is rendered on the workspace reflecting the received response, and a response is received resulting in an adjustment of the newly connected component on the workspace.

Figure 5:
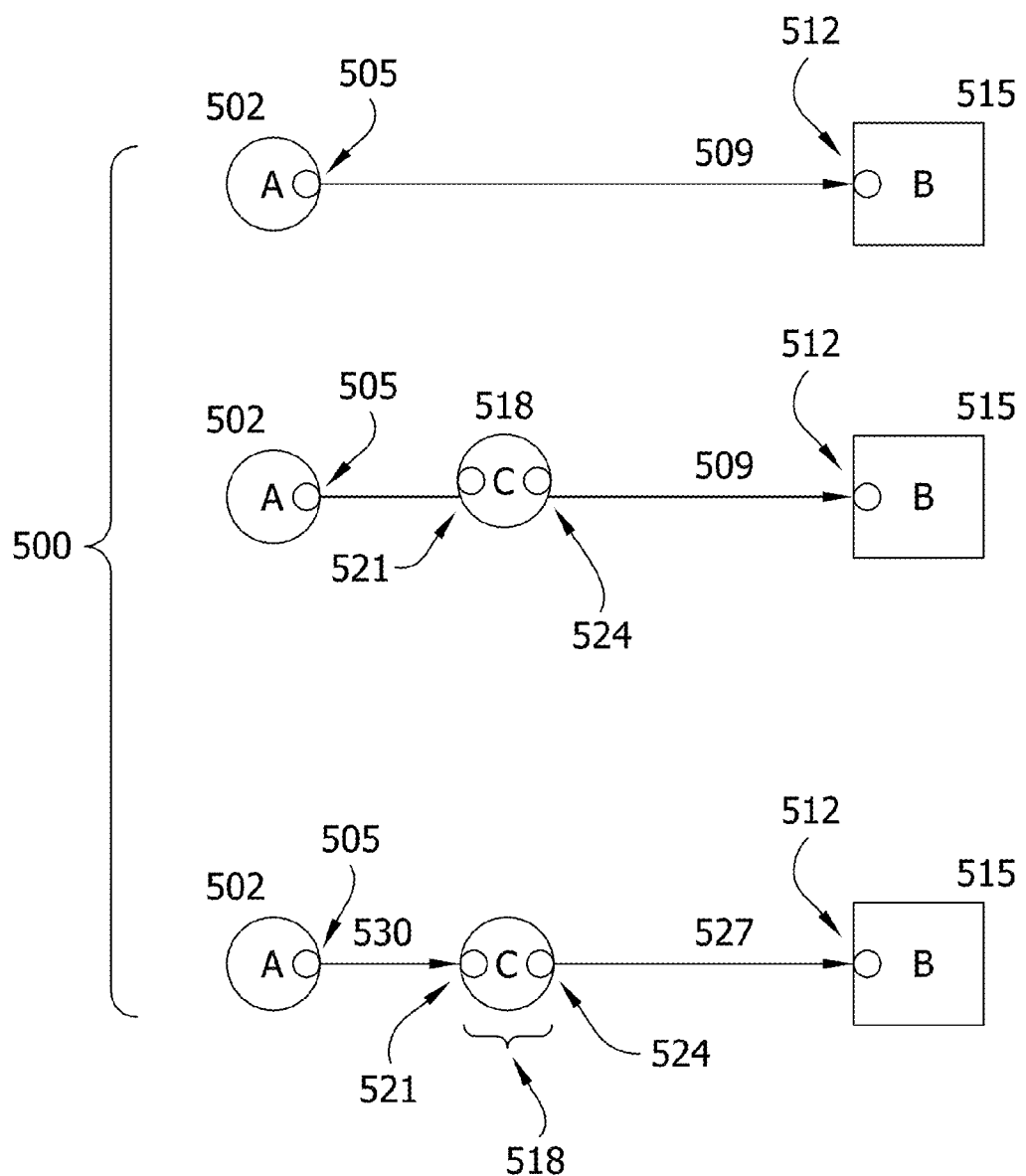
FIG. 5 depicts a process of suggesting and confirming object connections to a user according to another embodiment of the invention.

In yet another embodiment, FIG. 5 illustrates a procedure for placing an object into an existing stream indicated generally at 500. First, a user creates an existing stream 509 by connecting the outlet port 505 of a first object 502 to the inlet port 512 of a second object 515. In one alternative embodiment, the existing stream 509 is denoted with a label such as "S1." In another alternative embodiment, an outlet port 505 is distinguishable from an inlet port 512 visually. In still another embodiment, the visual distinction between ports is shown by a difference in color.

Second, a connection indication is received by the user that results in a suggested connection between a newly placed object 518 and an existing stream 509. In one embodiment, placing a new object 518 is accomplished by, for example, depressing a mouse button to select the object 518, then holding the object in the existing stream 509 for a few seconds. As a result of the received connection indication, a response is depicted to a user. In one embodiment, the existing connection 509 starts to glow to depict a response to a user.

Third, the newly placed object 518 is inserted into the currently existing stream 509, and the appropriate connections between the inlet port 521 and the outlet port 524 of the newly placed object 518 are made. In one embodiment, a first portion 527 of the previously existing stream 509 retains the label "S1" and the other portion 530 of the previously existing stream 509, which represents a new stream, is given a new label, such as "S2." In another embodiment, the streams are labeled based upon an algorithm, wherein the portion of the previously existing stream 509 with the greatest length retains the label "S1," and the new stream is given a new label such as "S2," as depicted in FIG. 5. In still other embodiments, various other procedures for designating labels are used. In one embodiment, the various other procedures are used in the event an algorithm is unable to accurately assign labels to the first 527 and other 530 portions of the previously existing stream 509.

While various aspects of a process model component connection procedure are defined, herein, it will be appreciated that the invention is not so limited by the specific terms, but encompasses equivalents of the various components. An object refers to a graphical representation of a process model component. In object-oriented programming, for example, an object is a self-contained entity that consists of both data and procedures to manipulate the data.

For purposes of illustration, programs and other executable program components, such as the operating system, are illustrated herein as discrete blocks. It is recognized, however, that such programs and components reside at various times in different storage components of a computing device, and are executed by a data processor(s) of the device.

Although described in connection with an exemplary computing system environment, embodiments of the aspects of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well-known computing systems, environments, and/or configurations that may be suitable for use with aspects of the invention include, but are not limited to, personal computers, server computers, handheld or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the invention may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and process without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

What is claimed is:

1. A computer implemented system to select and manipulate objects, the system comprising:
   a user interface in which objects are displayed and selected on a workspace of a graphical program;
   a processor capable of executing computer-executable instructions;
   a memory device coupled to the processor; and
   computer-executable instructions stored on the memory device, wherein the instructions, when executed by the processor, enable a user-initiated drag and drop operation on the workspace, comprising:
      enabling functionality to receive a connection indication associated with at least two objects on the workspace, each object having at least one port from which a collision mask extends to facilitate automatically connecting the ports of the objects via streams extending therebetween;
      receiving the connection indication from the user via the user interface, wherein the connection indication represents contact of the collision masks extending from the at least one port of each object;
      responsive to the connection indication received from the user, suggesting to the user via the user interface one or more potential connections between the ports of the objects on the workspace having contacting collision masks;
      requesting confirmation of at least one of the suggested connections;

receiving a response from the user via the user interface confirming the at least one of the suggested connections; and rendering an output on the workspace representative of the confirmed at least one of the suggested connections, said output comprising a stream extending between the ports of the objects.

2. The system of claim 1, wherein rendering the output further comprises instantiating at one new connection between the objects on the workspace.

3. The system of claim 1, wherein the connection indication further comprises the user moving a first object relative to a second object within the workspace.

4. The system of claim 1, wherein the user interface includes a palette displaying a plurality of objects represented by icons.

5. The system of claim 4, wherein the connection indication further comprises the user selecting an object from the palette by placing a cursor over the selected object, depressing and holding a mouse button, and dragging the selected object from the palette to the workspace toward an object previously placed on the workspace.

6. The system of claim 1, wherein suggesting the potential connections comprises displaying a dashed line connecting the objects on the workspace.

7. The system of claim 1, wherein requesting confirmation comprises requiring the user to depress a mouse button for a sufficient length of time.

8. The system of claim 1, wherein rendering the output comprises connecting the ports of the objects according to the confirmed suggested connection and deleting any suggested connections that were not confirmed.

9. The system of claim 1, wherein the objects comprise a first object having a port from which the collision mask of the first object extends and a second object having a port from which the collision mask of the second object extends, and wherein the connection indication comprises moving the first object so that the collision mask extending from the port of the first object approaches the collision mask extending from the port of the second object on the workspace.

10. The system of claim 9 wherein the computer-executable instructions stored on the memory device further comprise instructions for:

placing a third object between a confirmed suggested connection between the at least two objects;

suggesting to the user via the interface a potential connection between a port of the third object and the confirmed suggested connection between the ports of the first and second objects;

requesting confirmation of the suggestion;

receiving a response from the user via the user interface confirming the suggested connection; and rendering an output on the workspace representative of the confirmed suggested connection between the third object and the confirmed suggested connection between the first and second objects.

11. A computer-implemented method to select and manipulate objects, the method comprising:

extending a collision mask from at least one port of each of a plurality of objects on a workspace;

receiving, via a user interface, a connection indication from a user to automatically connect at least two of the objects on the workspace via streams extending between the ports of the objects, wherein the connection indication represents contact of the collision masks extending from the ports of the objects;

responsive to the connection indication received from the user, suggesting to the user via the user interface one or more potential connections between the ports of the objects on the workspace based on a relative proximity of the collision masks extending from the ports of the objects;

requesting confirmation of at least one of the suggested connections;

receiving a response from the user via the user interface confirming the at least one of the suggested connections; and rendering an output on the workspace representative of the confirmed at least one of the suggested connections, said output comprising a stream extending between the ports of the objects.

12. The method of claim 11, wherein rendering the output further comprises instantiating at least one new connection between the objects on the workspace.

13. The method of claim 11, wherein receiving the connection indication comprises the user moving a first object having a collision mask extending from at least one port thereof relative to a second object having a collision mask extending from at least one port thereof within the workspace so that the collision masks of each object come into contact.

14. The method of claim 11, wherein the user interface includes a palette displaying a plurality of objects represented by icons.

15. The method of claim 14, wherein receiving the connection indication comprises the user selecting an object from the palette by placing a cursor over the selected object, depressing and holding a mouse button, and dragging the selected object from the palette to the workspace toward an object previously placed on the workspace.

16. The method of claim 11, wherein suggesting the potential connections comprises displaying a dashed line connecting the objects on the workspace.

17. The method of claim 11, wherein requesting confirmation comprises requiring the user to depress a mouse button for a sufficient length of time.

18. The method of claim 11, wherein rendering the output comprises connecting the ports of the objects according to the confirmed suggested connection and deleting any suggested connections that were not confirmed.

19. The method of claim 11, wherein the objects comprise a first object having a port from which the collision mask of the first object extends and a second object having a port from which the collision mask of the second object extends, and wherein receiving the connection indication comprises moving the first object so that the collision mask extending from the port of the first object approaches the collision mask extending from the port of the second object on the workspace.

20. The method of claim 19, further comprising:

placing a third object between a confirmed suggested connection between the at least two objects;

suggesting to the user via the interface a potential connection between at least one port of the third object and the confirmed suggested connection between the ports of the first and second objects;

requesting confirmation of the suggestion;

receiving a response from the user via the user interface confirming the suggested connection; and rendering an output on the workspace representative of the confirmed suggested connection between the third object and the confirmed suggested connection between the first and second objects.

21. A tangible, non-transitory processor-readable storage media storing processor-executable instructions to select and manipulate objects, said instructions, when executed by the processor, enabling a user-initiated drag and drop operation on a user interface in which objects are displayed and selected on a workspace of a graphical program, said instructions comprising:
- a connector instruction for receiving a connection indication from the user via the user interface to automatically connect at least two objects on the workspace, wherein the at least two objects each have at least one port from which a collision mask associated therewith extends, and wherein the connection indication represents contact of the collision masks extending from the ports of the objects;
- a guideline instruction, responsive to the connection indication received from the user, for suggesting to the user via the user interface one or more potential connections between the ports of the objects on the workspace;
- a confirmation instructions for requesting confirmation of at least one of the suggested connections; and
- a rendering instruction, responsive to receiving confirmation from the user via the user interface confirming the at least one of the suggested connections, for rendering an output on the workspace representative of the confirmed at least one of the suggested connections, said output comprising a stream extending between the ports of the objects.

22. The memory of claim 21, wherein the rendering instruction comprises instantiating at least one new connection between the ports of the objects on the workspace.

23. The memory of claim 21, wherein the connection indication further comprises the user moving a first object of the at least two objects relative to a second object of the at least two objects within the workspace so that the collision masks associated with the ports of each object come into contact.

24. The memory of claim 21, wherein the user interface includes a palette displaying a plurality of objects represented by icons.

25. The memory of claim 24, wherein the connection indication further comprises the user selecting an object from the palette by placing a cursor over the selected object, depressing and holding a mouse button, and dragging the selected object from the palette to the workspace toward an object previously placed on the workspace.

26. The memory of claim 21, wherein the guideline instruction comprises displaying a dashed line connecting the ports of the objects on the workspace.

27. The memory of claim 21, wherein the confirmation instruction comprises requiring the user to depress a mouse button for a sufficient length of time.

28. The memory of claim 21, wherein the rendering instruction comprises connecting the ports of the objects according to the confirmed suggested connection and deleting any suggested connections that were not confirmed.

29. The memory of claim 21, wherein the objects comprise a first object having a port from which the collision mask of the first object extends and a second object having a port from which the collision mask of the second object extends, and wherein the instruction for receiving the connection indication comprises moving the first object so that the collision mask of the first object approaches the collision mask of the second object on the workspace.

30. The memory of claim 29, further comprising:
- a new stream instruction for suggesting, responsive to a third object being placed between a confirmed suggested connection, a potential connection between a port of the third object and a confirmed suggested connection between the ports of the first and second objects;
- wherein the confirmation instruction requests confirmation of the suggestion; and
- wherein the rendering instructions, responsive to receiving confirmation from the user via the user interface, renders an output on the workspace representative of the confirmed suggested connection between the port of the third object and the confirmed suggested connection between the ports of the first and second objects.

* * * * *